United States Patent
Toda et al.

(10) Patent No.: US 12,451,505 B2
(45) Date of Patent: Oct. 21, 2025

(54) OXIDE ION-CONDUCTING SOLID ELECTROLYTE

(71) Applicant: AGC Inc., Tokyo (JP)

(72) Inventors: Yoshitake Toda, Tokyo (JP); Satoru Tomeno, Tokyo (JP); Hiroshi Kaga, Tokyo (JP); Kazuhiko Yamada, Tokyo (JP)

(73) Assignee: AGC Inc., Tokyo (JP)

( * ) Notice: Subject to any disclaimer, the term of this patent is extended or adjusted under 35 U.S.C. 154(b) by 45 days.

(21) Appl. No.: 18/487,257

(22) Filed: Oct. 16, 2023

(65) Prior Publication Data

US 2024/0047723 A1 Feb. 8, 2024

Related U.S. Application Data

(63) Continuation of application No. PCT/JP2022/017864, filed on Apr. 14, 2022.

(30) Foreign Application Priority Data

Apr. 27, 2021 (JP) ................. 2021-075287

(51) Int. Cl.
    H01M 8/1246 (2016.01)
    G01N 27/407 (2006.01)
    H01M 8/12 (2016.01)

(52) U.S. Cl.
    CPC ...... *H01M 8/1246* (2013.01); *G01N 27/4073* (2013.01); *H01M 2008/1293* (2013.01)

(58) Field of Classification Search
    CPC ........ H01M 8/1246; H01M 2008/1293; G01N 27/4073
    See application file for complete search history.

(56) References Cited

U.S. PATENT DOCUMENTS

| 2003/0068553 | A1 | 4/2003 | Yamamura et al. |
| 2021/0025063 | A1* | 1/2021 | Hosono ................. C25B 11/093 |
| 2021/0028444 | A1* | 1/2021 | Laine .................... H01M 4/505 |

FOREIGN PATENT DOCUMENTS

| JP | 2003-238154 A | 8/2003 | |
| JP | 2014-55313 A | 3/2014 | |
| WO | WO-2013094346 A1 * | 6/2013 | ............. C01F 7/002 |

OTHER PUBLICATIONS

Ga-doped Ca12Al14O33 mayenite oxide ion conductors: synthesis, defects, and electrical propertiest, Yi et al., RSC Adv., 2019, 9, 3809-3815.*
Machine translation of JP2014055313.*
Machine translation of WO2013/094346.*
Lea, "The Chemistry of Cement and Concrete", Edward Arnold (Publishers) LTD, London, 1956, 2nd edition, 6 pages.
Lacerda et al., "High oxide ion conductivity in $Ca_{12}Al_{14}O_{33}$", Nature, vol. 332, 1988, pp. 525-526.
Salasin et al., "Structure Property Relationships and Cationic Doping in $[Ca_{24}Al_{28}O_{64}]^{4+}$ Framework: A Review", Crystals, vol. 7, 143, 2017, 25 pages.
Brese et al., "Bond-Valence Parameters for Solids", Acta Crystal, vol. B47, 1991, pp. 192-197.
Pedone et al., "A New Self-Consistent Empirical Interatomic Potential Model for Oxides, Silicates, and Silica-Based Glasses", J. Phys. Chem B, vol. 110, No. 24, 2006, pp. 11780-11795.

* cited by examiner

*Primary Examiner* — Haidung D Nguyen
(74) *Attorney, Agent, or Firm* — Oblon, McClelland, Maier &Neustadt, L.L.P.

(57) ABSTRACT

An oxide ion-conducting solid electrolyte containing a mayenite-type compound having a representative composition represented by $Ca_{12}Al_{14}O_{33}$, and 9 mol % to 30 mol % of titanium (Ti) in terms of $TiO_2$.

8 Claims, 9 Drawing Sheets

OXIDE ION-CONDUCTING SOLID ELECTROLYTE

CROSS-REFERENCE TO RELATED APPLICATIONS

This application is a continuation application of International Application No. PCT/JP2022/017864, filed on Apr. 14, 2022, and designating the U.S., which is based upon and claims priority to Japanese Patent Application No. 2021-075287, filed on Apr. 27, 2021, the entire contents of which are incorporated herein by reference.

BACKGROUND

Technical Field

The present invention relates to an oxide ion-conducting solid electrolyte.

Description of Related Art

Solid electrolytes having an oxide-ion conducting property are used for various purposes of use such as solid oxide fuel cells (SOFC), solid oxide electrolysis cells (SOEC), oxygen sensors, and oxygen pumps. In recent years, a high-efficiency energy system in which a SOFC and a SOEC are combined has been drawing attention as one embodiment of a technical concept referred to as Power to Gas/Chemical, which has been drawing attention for popularization of renewable energy.

SOFCs and SOECs are both electrochemical cells that act at high temperatures. The former is compatible with various fuels such as hydrogen, carbon monoxide, and methane. The latter can electrolyze water and carbon dioxide produced from the operation of the SOFC and return them to hydrogen and carbon monoxide.

SOFCs and SOECs each have a solid electrolyte provided between two electrodes, and operate by oxide ions being conducted through the solid electrolyte.

SUMMARY

So far, many materials such as yttria-stabilized zirconia (YSZ) and Scandia-stabilized zirconia (ScSZ) have been studied as solid electrolytes for SOFCs and SOECs.

However, it is difficult to say that even YSZ and ScSZ have a sufficient oxide ion-conducting property. Solid electrolytes having a higher oxide ion-conducting property are in demand.

The present invention has been made in this circumstance, and an object of the present invention is to provide a solid electrolyte that can replace existing materials and has a high oxide ion-conducting property.

The present invention provides an oxide ion-conducting solid electrolyte containing: a mayenite-type compound having a representative composition represented by $Ca_{12}Al_{14}O_{33}$; and 9 mol % to 30 mol % of titanium (Ti) in terms of $TiO_2$.

The present invention also provides an oxide ion-conducting solid electrolyte containing a mayenite-type compound having a representative composition represented by $Ca_{12}Al_{14}O_{33}$, wherein the mayenite-type compound contains 9 mol % to 30 mol % of titanium (Ti) in terms of $TiO_2$.

The present invention can provide a solid electrolyte that can replace existing materials and has a high oxide ion-conducting property.

DETAILED DESCRIPTION

Figure 1:
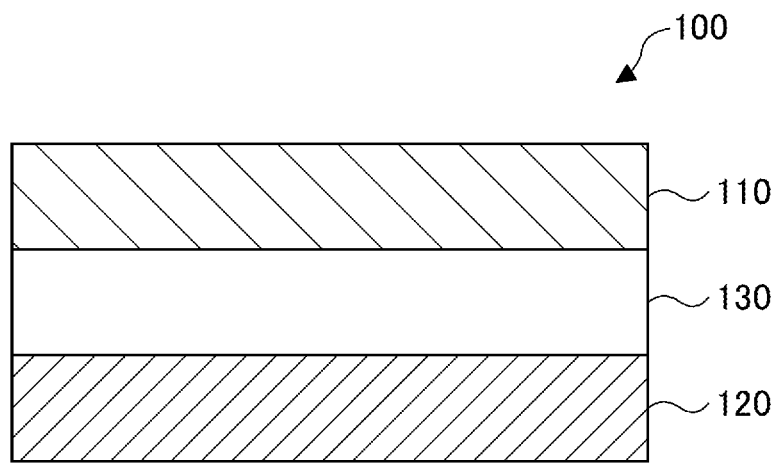
FIG. 1 is a cross-sectional view schematically illustrating an example of a configuration of a SOFC.

An embodiment of the present invention will be described below.

(Oxide Ion-Conducting Solid Electrolyte According to an Embodiment of the Present Invention)

According to an embodiment of the present invention, an oxide ion-conducting solid electrolyte is provided. The oxide ion-conducting solid electrolyte contains a mayenite-type compound having a representative composition represented by $Ca_{12}Al_{14}O_{33}$, wherein the mayenite-type compound contains 9 mol % to 30 mol % of titanium (Ti) in terms of $TiO_2$.

The oxide ion-conducting solid electrolyte according to an embodiment of the present invention (hereinafter, referred to as "first solid electrolyte") contains a mayenite-type compound having a C12A7 structure ($Ca_{12}Al_{14}O_{33}$).

The mayenite-type compound has a representative composition represented by $12CaO \cdot 7Al_2O_3$, and has a characteristic crystal structure containing voids (cages) that are three-dimensionally linked and each have a diameter of approximately 0.4 nm.

The lattice framework that constitutes the cages bears positive charges, and forms twelve cages per unit cell. One sixth of the cages satisfy the crystal's electroneutrality condition, and are hence internally occupied with oxide ion. However, the oxide ions in such cages have a property chemically different from that of other oxygen ions that constitute the lattice framework. Hence, the oxide ions in the cages are referred to particularly as free oxide ions.

The mayenite-type compound is also represented by a composition formula: $[Ca_{24}Al_{28}O_{64}]^{4+}(O^{2-})_2$ (see F. M. Lea, C. H. Desch, The Chemistry of Cement and Concrete, 2nd ed., p. 52, Edward Arnold & Co., London, 1956).

Because the mayenite-type compound contains free oxide ions in the cages as described above, it may be able to function as an oxide ion conductor (see M. Lacerda et al., "High Oxide ion conductivity in $Ca_{12}Al_{14}O_{33}$" Nature, vol. 332, P 525, 7, April (1988)).

However, it has been confirmed by the present inventors' analyses that the ion-conducting property of the mayenite-type compound having the composition formula described above is not very high (for example approximately 1/10 of YSZ).

So far, the present inventors have earnestly conducted research and development into the method for increasing the ion-conducting property of mayenite-type compounds. As a result, the present inventors have found that addition of titanium (Ti) to mayenite-type compounds can significantly increase the ion-conducting property of the mayenite-type compounds, and have reached the present invention.

Accordingly, in the oxide ion-conducting solid electrolyte according to an embodiment of the present invention, the mayenite-type compound contains Ti.

In the present invention, the constituent elements of the mayenite-type compound are not limited to calcium (Ca), aluminum (Al), and oxygen (O) so long as the mayenite-type compound has a C12A7 crystal structure constituted by calcium (Ca), aluminum (Al), and oxygen (O). For example, it is known that part of calcium (Ca) can be replaced with one or more atoms selected from the group consisting of magnesium (Mg), strontium (Sr), manganese (Mn), cobalt (Co), nickel (Ni), copper (Cu), zinc (Zn), cerium (Ce), praseodymium (Pr), neodymium (Nd), samarium (Sm), europium (Eu), gadolinium (Gd), dysprosium (Dy), holmium (Ho), ytterbium (Yb), and tantalum (Ta). It is also known that part of aluminum (Al) can be replaced with one or more atoms selected from the group consisting of phosphorus (P), silicon (Si), gallium (Ga), vanadium (V), manganese (Mn), iron (Fe), cobalt (Co), and niobium (Nb) (see J. Salasin et al. Crystals vol. 7, 143 (2017)).

Particularly, in an embodiment of the present invention, Ti is added by 9 mol % or greater in terms of $TiO_2$. This is because no significant effect appears in the ion-conducting property of the mayenite-type compound when the content of Ti is less than 9 mol %. However, it is difficult to enclose Ti that is added more than necessary within the mayenite-type crystal structure. Hence, in the oxide ion-conducting solid electrolyte according to an embodiment of the present invention, the Ti content is limited to 30 mol % or less.

The Ti content is preferably 10 mol % or greater, and more preferably 15 mol % or greater.

It is considered that Ti added to the oxide ion-conducting solid electrolyte according to an embodiment of the present invention is positioned to replace the site of the aluminum (Al) atom of the mayenite-type compound. The Ti/Al mole ratio of Ti atom to Al atom may be 0.15≤Ti/Al≤0.50.

Because the oxide ion-conducting solid electrolyte according to an embodiment of the present invention has a significantly high ion-conducting property, it can be used as a solid electrolyte to replace existing materials.

Presently, the following is considered the reason why addition of a predetermined amount of Ti to a mayenite-type compound increases the ion-conducting property.

When Ti is added to a mayenite-type compound, it is considered that Ti atoms are positioned to replace the sites of Al atoms preferentially. However, Al atoms are trivalent, whereas Ti atoms are tetravalent. Hence, when an Al atom is replaced with a Ti atom, the oxide ion concentration increases because of electroneutrality.

Here, in cases of ordinary compounds, excessive insertion of oxide ions, for example, in between lattices may make the compounds unstable or impossible to synthesize, or may bring about problems such as decrease in the ion conductance.

As compared, in cases of mayenite-type compounds, the only effect is increase in the concentration of the free oxide ion in the cages that behaves as the ion-conducting carrier. It is considered that their ion-conducting property improves as a result of the compounds' crystal structure being retained.

Based on this consideration, there is a possibility that the ion-conducting property of mayenite-type compounds may improve also by addition of a tetravalent ion other than Ti. However, according to the present inventors' experiments, no significant improvement was observed in the ion-conducting property by addition of silicon (Si) and germanium (Ge), which are the same tetravalent ions as Ti.

This result suggests a possibility that the ionic radius of an added element and the chemically bound state of the added element with the surrounding oxygen may affect the ion-conducting property of mayenite-type compounds. The electrostatic binding intensity between atoms that constitute a crystal is referred to as bond valence. When Si, Ge, and Ti are compared in terms of a bond valence parameter, which determines the magnitude of the bond valence, Ti has the maximum bond valence parameter (see N. E. Brese et al. Acta Crystallogr. vol. B47, 192-197 (1991)). That is, it is predicted that an increased binding between oxygen that constitutes the crystal framework and the added Ti may weaken the binding between the free oxide ion and the crystal framework and facilitate migration of the free oxide ion. It is considered that the ion-conducting property may improve as a result.

However, the described mechanism behind the improvement of the ion-conducting property is based on the experimental studies at present. The ion-conducting property of the oxide ion-conducting solid electrolyte according to an embodiment of the present invention may improve through any other mechanism.

(Other Features)

Because of being ceramic, the oxide ion-conducting solid electrolyte according to an embodiment of the present invention has a high high-temperature stability. For example, the oxide ion-conducting solid electrolyte according to an embodiment of the present invention can be stably used in a temperature range of 800° C. or higher.

(Uses)

The oxide ion-conducting solid electrolyte according to an embodiment of the present invention is stable even at high temperatures, and has a significantly high oxide ion-conducting property. Hence, the oxide ion-conducting solid electrolyte according to an embodiment of the present invention can be used as a solid electrolyte of a SOFC, a SOEC, an oxygen sensor, and an oxygen pump.

FIG. 1 schematically illustrates a configuration of a SOFC.

As illustrated in FIG. 1, the SOFC 100 includes an oxygen pole 110, a fuel pole 120, and a solid electrolyte layer 130 between these electrodes.

During operation of the SOFC 100 having the configuration, for example, the following reaction occurs at the oxygen pole 110:

$$O_2 + 4e^- \rightarrow 2O^{2-} \qquad \text{Formula (1)}$$

The oxide ion produced at the oxygen pole 110 passes through the solid electrolyte layer 130, and reaches the fuel pole 120 on the opposite side. For example, the following reaction occurs at the fuel pole 120:

$$2H_2 + 2O^{2-} \rightarrow 2H_2O + 4e^- \qquad \text{Formula (2)}$$

Hence, when the SOFC 100 is connected to an external load, the reactions of Formula (1) and Formula (2) continue. Hence, power can be fed to the external load.

Meanwhile, a SOEC typically has the same configuration as that of the SOFC 100 illustrated in FIG. 1.

However, in the SOEC, for example, the following reaction occurs at the oxygen pole 110, which is illustrated in FIG. 1 described above:

$$2O^{2-} \rightarrow O_2 + 4e^-$$ Formula (3)

Moreover, for example, the following reaction occurs at the fuel pole 120:

$$2H_2O + 4e^- \rightarrow 2H_2 + 2O^{2-}$$ Formula (4)

The oxide ion produced at the fuel pole 120 passes through the solid electrolyte 130 and reaches the oxygen pole 110 on the opposite side. Hence, when the SOEC is connected to an external power supply, the reactions of Formula (3) and Formula (4) continue.

In such an electrochemical cell, the oxide ion-conducting solid electrolyte according to an embodiment of the present invention can be used as an "electrolyte layer" situated between two electrodes, and in addition, as an "electrolyte component" contained in the electrode.

Moreover, the solid electrolyte according to an embodiment of the present invention may be used in any form. For example, the solid electrolyte according to an embodiment of the present invention may be provided in the form of a powder. Alternatively, the solid electrolyte according to an embodiment of the present invention may be provided in the form of a slurry, a paste, or a dispersion liquid by being mixed with either or both of, for example, a solvent and a binder.

In addition to these, various forms of use are conceivable.

(Method for Producing Oxide Ion-Conducting Solid Electrolyte According to an Embodiment of the Present Invention)

Next, with reference to FIG. 2, an example of a method for producing the oxide ion-conducting solid electrolyte according to an embodiment of the present invention will be described.

Figure 2:
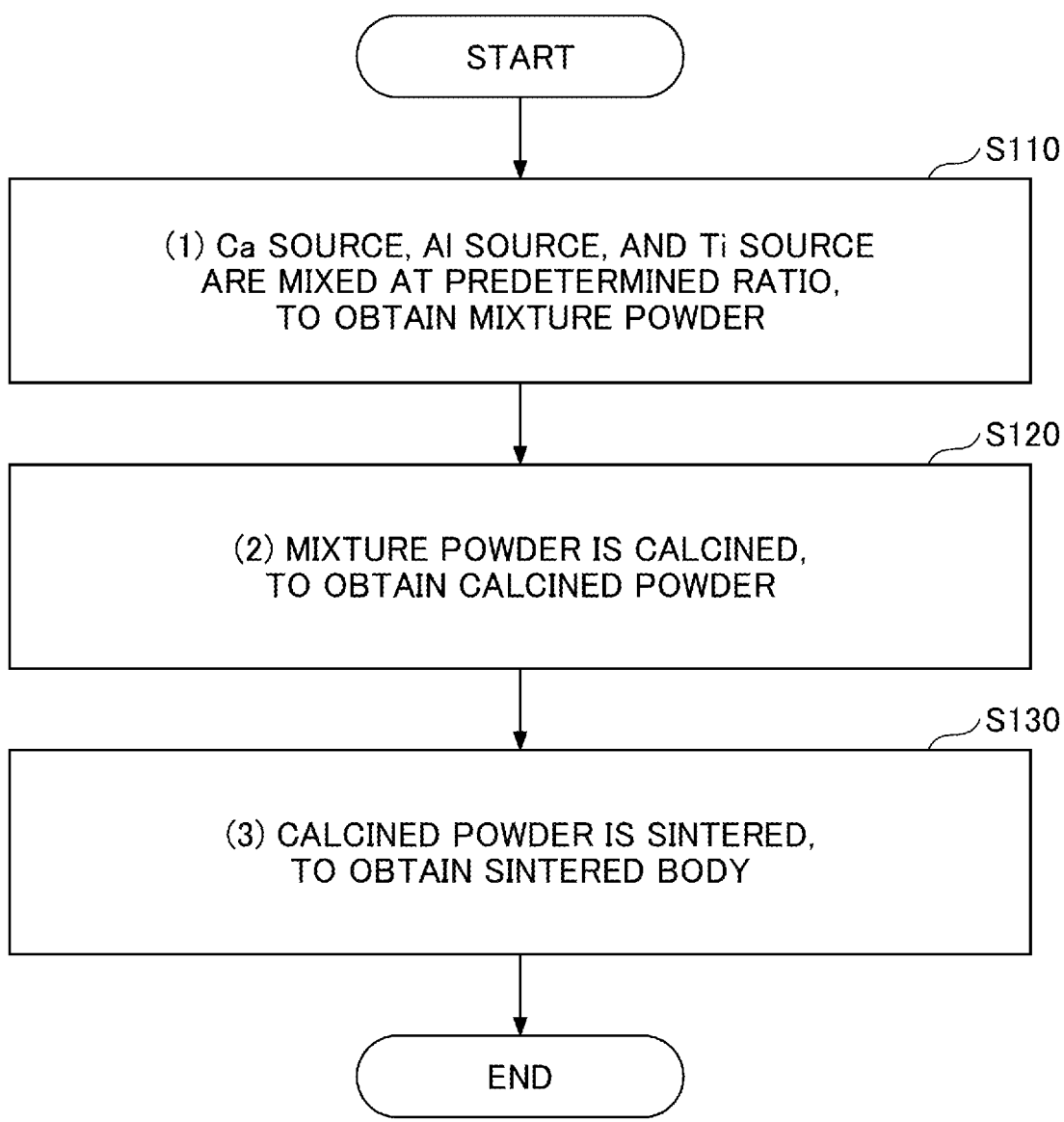
FIG. 2 is a drawing exemplarily illustrating an example of a flow of a method for producing an oxide ion-conducting solid electrolyte according to an embodiment of the present invention.

FIG. 2 exemplarily illustrates an example of the flow of the method for producing the oxide ion-conducting solid electrolyte according to an embodiment of the present invention (hereinafter, referred to as "first producing method").

As illustrated in FIG. 2, the first producing method includes:

(1) a step of mixing a Ca source, an Al source, and a Ti source at a predetermined ratio, to obtain a mixture powder (step S110);

(2) a step of calcining the mixture powder, to obtain a calcined powder (step S120); and (3) a step of sintering the calcined powder, to obtain a sintered body (step S130).

Each step will be described below.

(Step S110)

First, a mixture powder is prepared. For this purpose, a Ca source, an Al source, and a Ti source are mixed at a predetermined ratio.

The Ca source may be selected from, for example, metal calcium, calcium carbonate, calcium oxide, calcium hydroxide, calcium nitrate, and calcium acetate.

The Al source may be selected from, for example, metal aluminum, α alumina, γ alumina, aluminum hydroxide, aluminum nitrate, and aluminum lactate.

The Ti source may be selected from, for example, metal titanium, rutile-type titanium oxide, anatase-type titanium oxide, titanium oxide (II), and titanium oxide (III).

The raw materials are weighed out and mixed such that a mayenite having the intended composition is obtained.

The mixing method is not particularly limited so long as a uniform mixture powder is obtained.

(Step S120)

Next, the mixture powder is calcined.

The calcining step is performed in order to desorb compounds such as carbonic acid and nitric acid contained in the mixture powder, and facilitate production of the intended mayenite-type compound in the next sintering step.

The calcining conditions are not particularly limited. However, in order to obtain the intended mixture oxide, the calcining temperature is preferably 1,000° C. or higher. However, when the calcining temperature is excessively high, the mixture powder is excessively crystallized. Hence, the calcining temperature is preferably 1,300° C. or lower.

The calcining time is, for example, approximately from 5 hours through 24 hours. However, the calcining time varies depending on the calcining temperature. The higher the calcining temperature, the more the calcining time can be shortened.

As a result, a calcined powder is obtained.

The calcined powder may be pulverized as needed. The average particle diameter through pulverization may be in a range of, for example, from 1 μm through 100 μm.

(Step S130)

Next, the calcined powder is sintered.

The sintering step is performed in order to obtain a dense sintered body having the intended crystal phase.

The calcined powder may be molded before the sintering step, and the sintering step may be performed using the obtained molded body.

For example, the molding conditions are not particularly limited. Common molding methods such as a uniaxial molding method or an isostatic pressing method may be employed.

The sintering method is not particularly limited. For example, the calcined powder or a molded body may be sintered by a pressure-less sintering method at normal pressure.

Alternatively, the calcined powder may be sintered using a pressure sintering method such as hot press sintering or spark plasma sintering. In this case, molding and sintering may be performed at the same time.

The sintering temperature is not particularly limited so long as an appropriate sintered body is obtained, yet is preferably in a range of from 1,200° C. through 1,400° C. When the sintering temperature is excessively low, a dense sintered body may not be obtained. When the sintering temperature is excessively high, the processed body may melt.

It is desirable to select an appropriate time as the sintering time depending on the sintering temperature. Generally, sintering is completed in a shorter time as the sintering temperature is higher.

An appropriate sintering time, which may vary depending on the sintering temperature, is, for example, approximately from 5 hours through 48 hours in a case of a pressure-less sintering method, and is, for example, approximately from 5 minutes through 60 minutes in a case of a pressure sintering process by a spark plasma.

When a pressure sintering process is performed using a container made of carbon, carbon may adhere to the surface of the sintered body. In such a case, it is possible to remove the adhering carbon by a thermal treatment at an atmospheric pressure at from 800° C. through 1,000° C. for approximately 5 hours.

Through the steps described above, the oxide ion-conducting solid electrolyte according to an embodiment of the present invention can be produced.

(Another Method for Producing Oxide Ion-Conducting Solid Electrolyte According to an Embodiment of the Present Invention)

Next, with reference to FIG. 3, another example of the method for producing the oxide ion-conducting solid electrolyte according to an embodiment of the present invention will be described.

Figure 3:
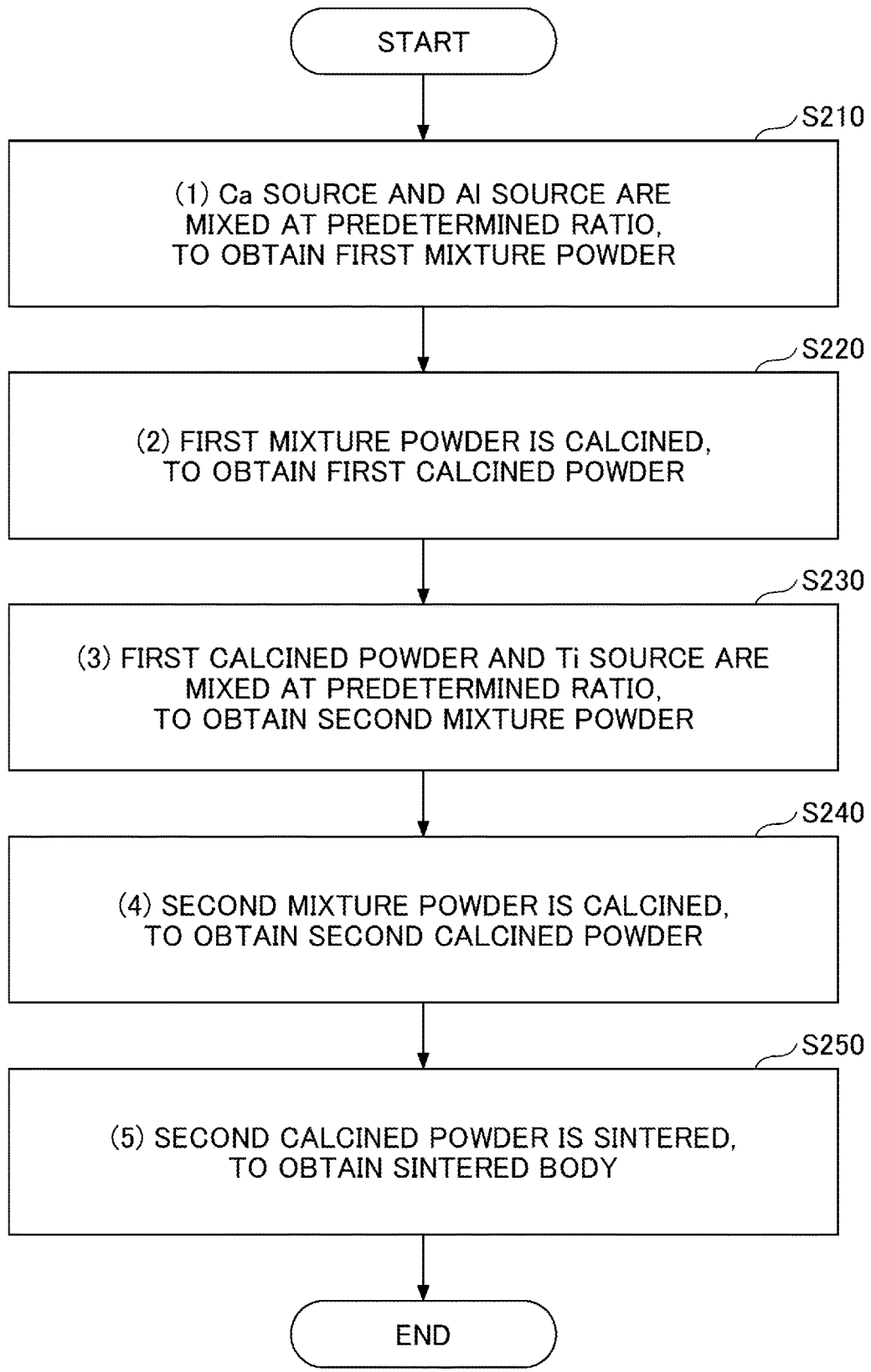
FIG. 3 is a drawing exemplarily illustrating an example of a flow of another method for producing an oxide ion-conducting solid electrolyte according to an embodiment of the present invention.

FIG. 3 exemplarily illustrates an example of the flow of the another method for producing the oxide ion-conducting solid electrolyte according to an embodiment of the present invention (hereinafter, referred to as "second producing method").

As illustrated in FIG. 3, the second producing method includes:

(1) a step of mixing a Ca source and an Al source at a predetermined ratio, to obtain a first mixture powder (step S210);

(2) a step of calcining the first mixture powder, to obtain a first calcined powder (step S220);

(3) a step of mixing the first calcined powder and a Ti source at a predetermined ratio, to obtain a second mixture powder (step S230);

(4) a step of calcining the second mixture powder, to obtain a second calcined powder (step S240); and (5) a step of sintering the second calcined powder, to obtain a sintered body (step S250).

Each step included in the second producing method can be easily understood by a person ordinarily skilled in the art based on the descriptions about the step S110 to the step S130 of the first producing method described above. Hence, descriptions about the details of each step will be omitted here.

However, in the second producing method, the oxide ion-conducting solid electrolyte is produced through two calcining steps (step S220 and step S240), unlike in the first producing method.

In this case, it is possible to produce an oxide ion-conducting solid electrolyte having a more uniform composition than when the mixture powder containing the Ca source, the Al source, and the Ti source is calcined simultaneously as in the first producing method.

That is, according to the first producing method, there is a possibility that a heterogenous phase may be formed through reaction of Ca and Ti that have a high reactivity with each other. As compared with this, in the second producing method, it is possible to previously prepare a calcined powder, in which Ca and Al have reacted and bound with each other, in the first calcining step (step S220). Hence, in the second calcining step (step S240), it is possible to more reliably bind Ca, Al, and Ti with one another in a desired site in the mayenite-type compound.

The method for producing the oxide ion-conducting solid electrolyte according to an embodiment of the present invention has been described above, using the first producing method and the second producing method as examples. However, the foregoing description is a mere example, and the oxide ion-conducting solid electrolyte according to an embodiment of the present invention may be produced by any other method such as a hydrothermal method, a sol/gel method, and a liquid phase combustion method.

EXAMPLES

Examples of the present invention will be described below.

(Simulative Evaluation)

The effects on the ion-conducting property of a mayenite-type compound having a C12A7 structure by addition of Ti to the mayenite-type compound were evaluated by simulation.

In the simulation, a relationship between mean square displacements MSD of the oxide ion in the material at 1 atm at 1200 K, and elapsed times was calculated based on the classical molecular dynamics calculation.

The code used for the calculation was LAMMPS. For the two-body potential between the constituent elements of each material, which is an input parameter, values reported by Pedone et al. (see A. Pedone et al. J. Phys. Chem. B 110, 11780-11795 (2006)) were used.

NPT-ensembles of systems, in which Ti was substituted for 0 mol %, 7 mol %, or 14 mol % of Al in a 6×6×6 expanded supercell of a unit cell, were molecular-dynamically simulated for 1 nanosecond. After the temperature, the internal energy, and the lattice constants became stable, NVE-ensembles were molecular-dynamically simulated for 1 nanosecond.

The targets of the calculation were the following three types of compounds:

(i) an unsubstituted mayenite-type compound, i.e., the $12CaO·7Al_2O_3$ compound;

(ii) a compound obtained by substituting Ti atoms for 7% of the Al atoms in a mayenite-type compound (Ti accounted for 5 mol % of the whole in terms of $TiO_2$): and (iii) a compound obtained by substituting Ti atoms for 14% of the Al atoms in a mayenite-type compound (Ti accounted for 10 mol % of the whole in terms of $TiO_2$)

Figure 4:
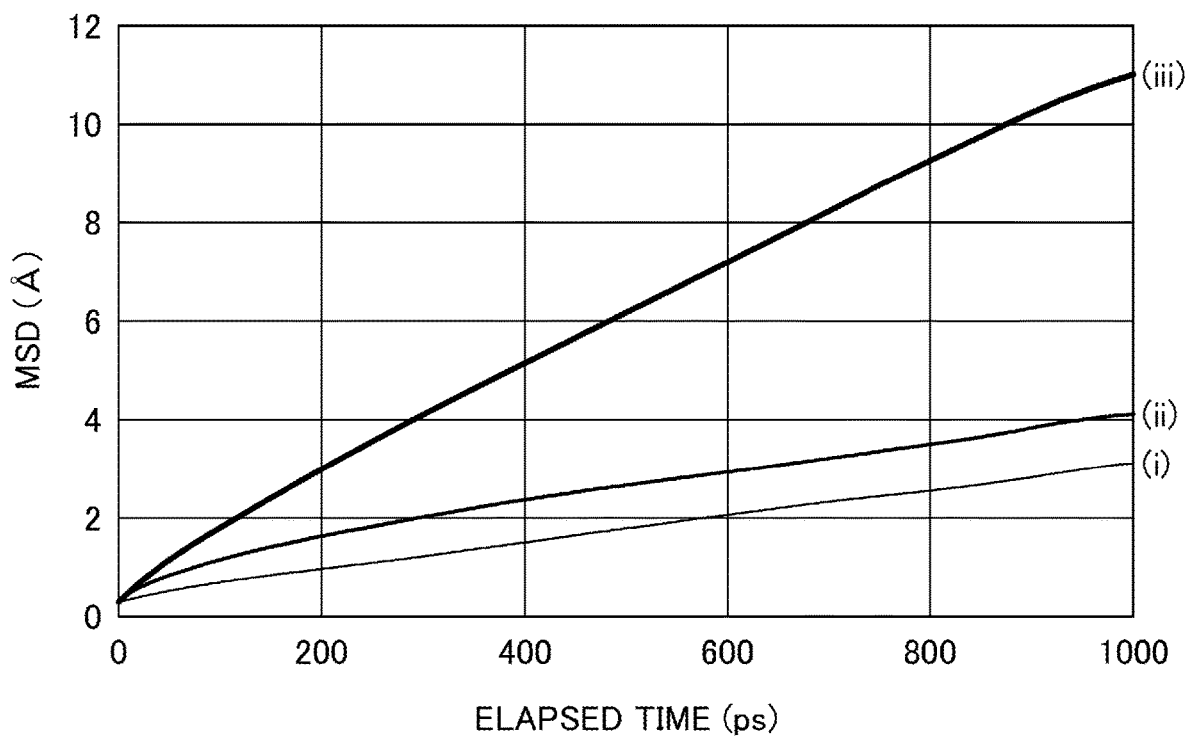
FIG. 4 is a drawing illustrating results of simulative evaluation of effects of Ti addition on ion conduction of a mayenite-type compound having a C12A7 structure.

FIG. 4 illustrates the results of the simulation of each of the compounds (i) to (iii).

In FIG. 4, the horizontal axis represents elapsed time, and the vertical axis represents the MSD of oxygen.

The slope of the MSD is proportional to the coefficient of diffusion. Hence, it is indicated that it is easier for the oxide ion to migrate inside a mayenite-type compound, as the material of the mayenite-type compound has a greater MSD slope.

As the MSD slope in FIG. 4, the slope at a portion at which the behaviors of each compound were represented by a straight line was adopted.

Table 1 below collectively presents the MSD slopes of the three types of compounds.

TABLE 1

| Compound | Slope | Slope ratio to compound (i) |
| --- | --- | --- |
| (i) | 0.0027 | 1 |
| (ii) | 0.0033 | 1.2 |
| (iii) | 0.0105 | 3.9 |

As illustrated in FIG. 4 and Table 1, the compounds (ii) and (iii) obtained by substituting Ti atoms for some of the Al atoms of a mayenite-type compound had MSD slopes that were greater than that of the unsubstituted mayenite-type compound (i).

However, the compound (ii) did not exhibit a very remarkable tendency of slope increase from the compound (i). The MSD slope of the compound (ii) was approximately 1.2 times as great as that of the compound (i).

As compared, the MSD slope of the compound (iii) was approximately four times as great as that of the compound (i), and the MSD slope increased considerably.

Judging from this, it was revealed that the ion-conducting property for the oxide ion could be significantly improved in a mayenite-type compound in which Ti atoms were substituted for 14% of the Al atoms.

Example 1

A sintered body was produced by the following method.
[Blending Step]
Calcium carbonate (4.20 g), α alumina (2.12 g), and rutile-type titanium oxide (0.55 g) were each weighed out. They were added into a pot in which φ 5 mm zirconia balls and 10 cc of isopropanol were added, and pulverized and mixed for 3 hours by a planetary ball mill method. Next, the mixture powder was dried at 100° C., to remove isopropanol. Then, the mixture powder was further sieved, to be separated from the zirconia balls.
[Calcining Step]
The obtained mixture powder was added into an alumina crucible, and calcined in open air at 1,200° C. for 5 hours. The obtained sample was pulverized in an agate mortar, to produce a calcined powder.
[Sintering Step]
The calcined powder (1 g) was added into φ 1.5 cm hardmetal dies and uniaxially molded by application of a pressure of 20 kN using a hydraulic press machine. Then, the resulting product was isostatically pressed at 196 MPa, to produce a φ 1.5 cm pellet. The pellet was thermally treated in open air at 1,300° C. for 12 hours, to obtain a sintered body having a diameter φ of 1.3 cmφ and a thickness of 2 mm.

The obtained sintered body was referred to as "Sample 1". In Sample 1, the Ti content was 10 mol % in terms of $TiO_2$, and the Ti/Al mole ratio was 0.17.

Example 2

A sintered body was produced by the same method as in Example 1. However, in Example 2, a mixture powder was prepared by mixing calcium carbonate (4.37 g), α alumina (1.90 g), and rutile-type titanium oxide (0.82 g) in [Blending step] described above. The other steps were the same as in Example 1.

The obtained sintered body was referred to as "Sample 2". In Sample 2, the Ti content was 15 mol % in terms of $TiO_2$, and the Ti/Al mole ratio was 0.27.

Example 11

A sintered body was produced by the same method as in Example 1. However, in Example 11, a mixture powder was prepared by mixing calcium carbonate (4.12 g) and α alumina (2.57 g) in [Blending step] described above. That is, no Ti source was added to prepare the mixture powder. The other steps were the same as in Example 1.

The obtained sintered body was referred to as "Sample 11".

Example 12

A sintered body was produced by the same method as in Example 1. However, in Example 12, a mixture powder was prepared by mixing calcium carbonate (4.24 g), α alumina (2.23 g), and rutile-type titanium oxide (0.42 g) in [Blending step] described above. The other steps were the same as in Example 1.

The obtained sintered body was referred to as "Sample 12". In Sample 12, the Ti content was 8 mol % in terms of $TiO_2$, and the Ti/Al mole ratio was 0.12.

Table 2 below collectively presents the amount of Ti and the Ti/Al mole ratio in each sample.

TABLE 2

| Sample | Ti content (mol %) | Ti/Al mole ratio |
|---|---|---|
| 1 | 10 | 0.17 |
| 2 | 15 | 0.27 |
| 11 | — | 0 |
| 12 | 8 | 0.12 |

(Evaluation)
Each sample was evaluated in terms of the following.
(X-Ray Diffractometry)
X-ray diffractometry was performed using Sample 1 and Sample 2.

Figure 5:
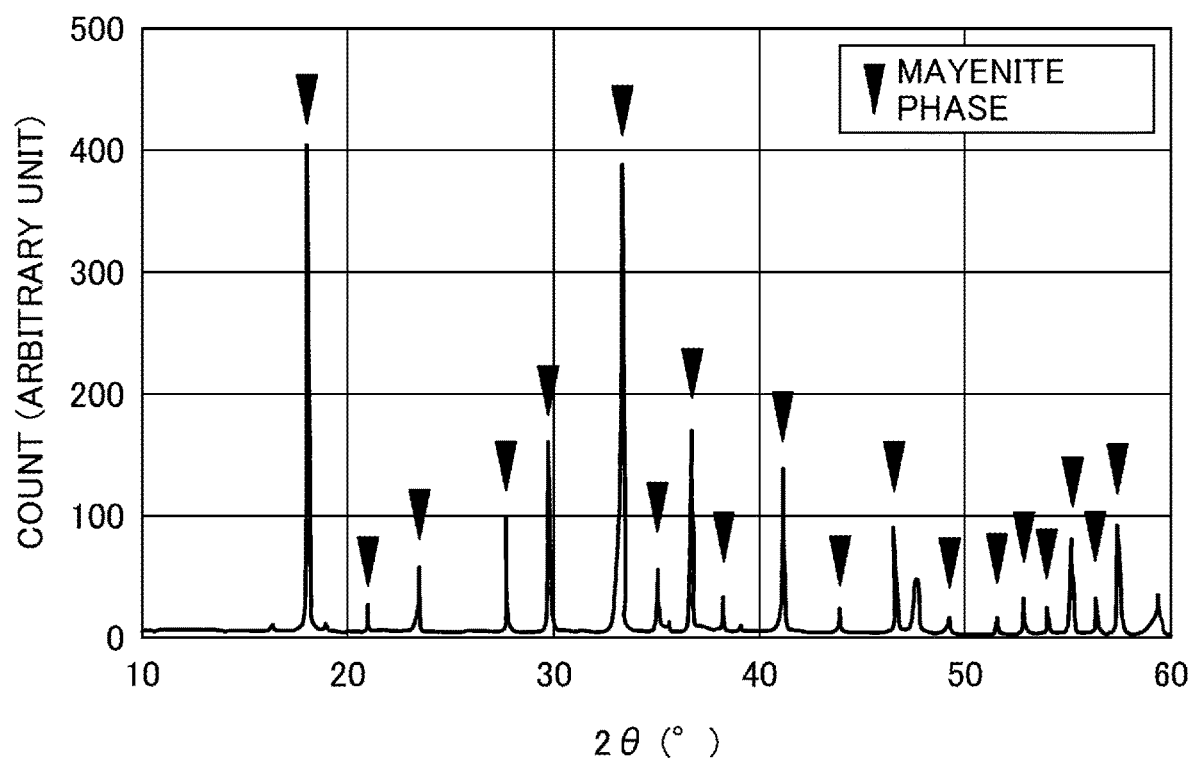
FIG. 5 is a drawing illustrating an X-ray diffraction pattern of an oxide ion-conducting solid electrolyte (Sample 1) according to an embodiment of the present invention.
Figure 6:
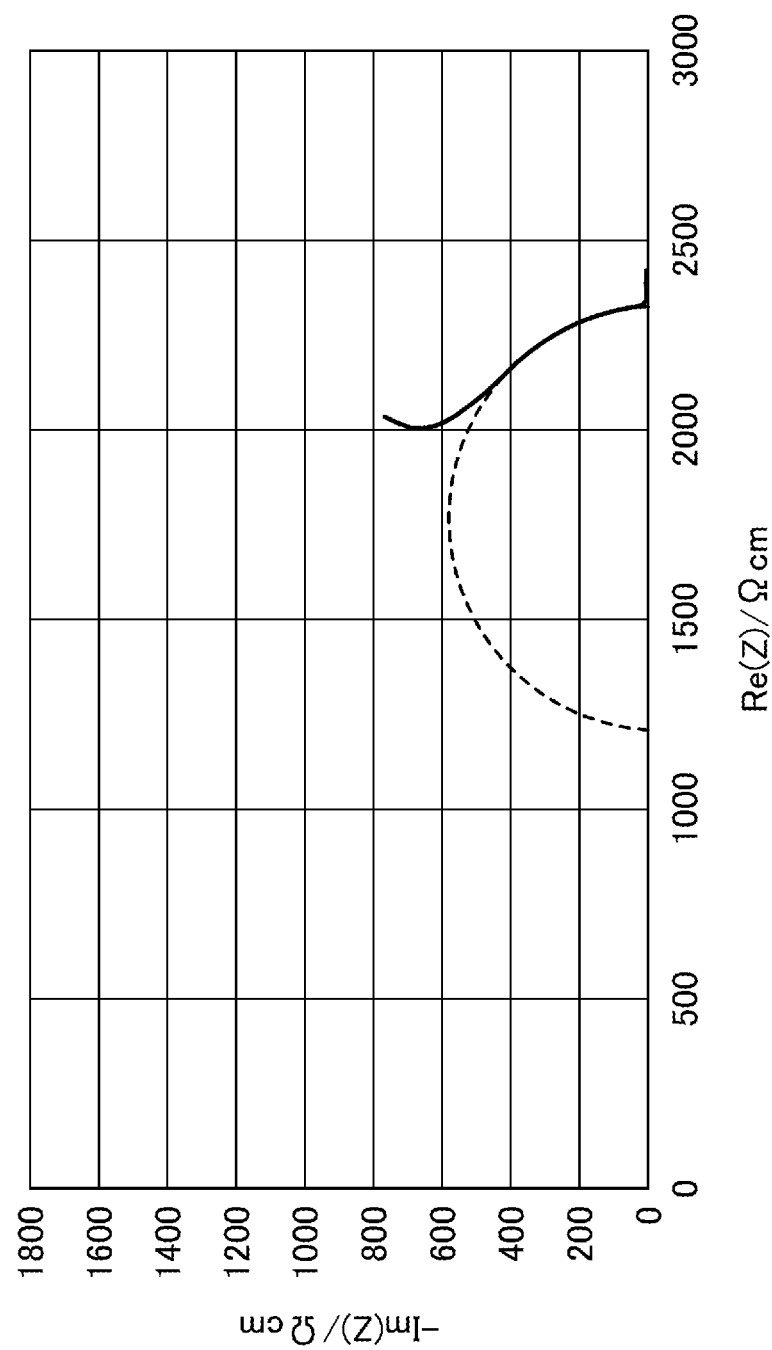
FIG. 6 is a drawing illustrating a Cole-Cole plot obtained from Sample 1.
Figure 7:
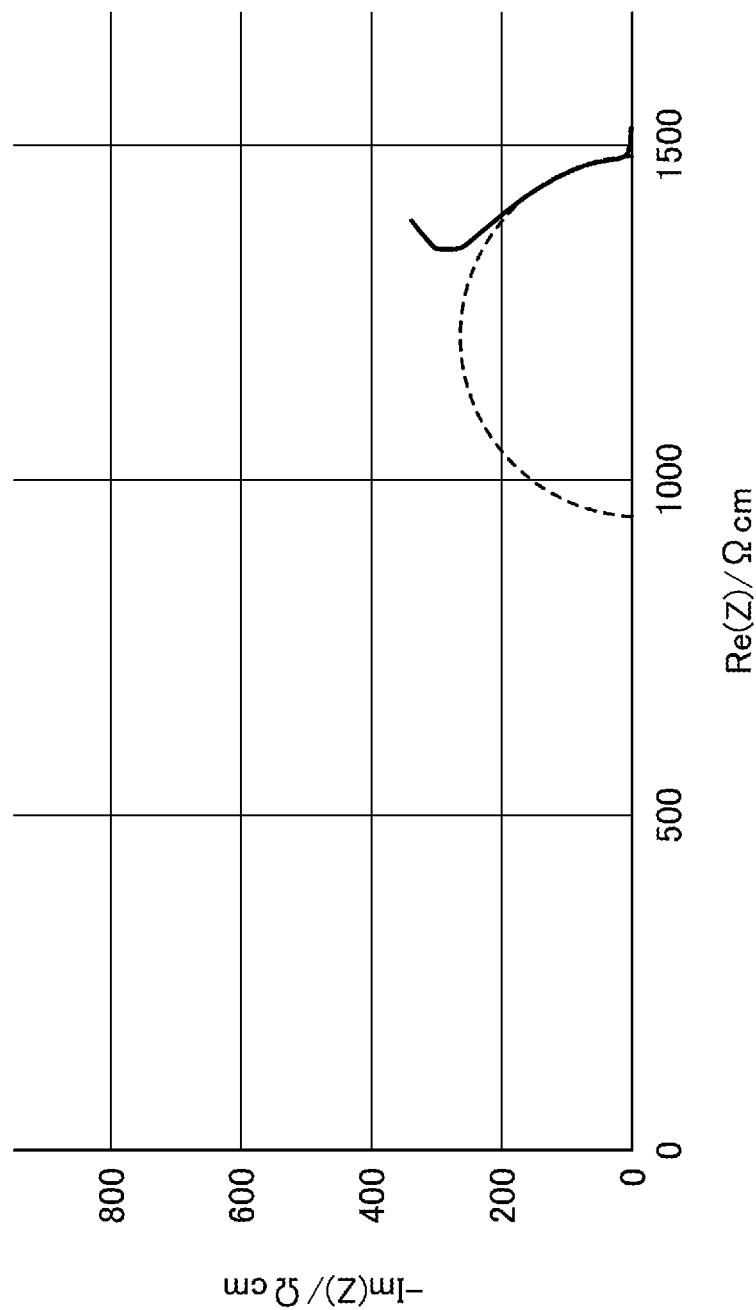
FIG. 7 is a drawing illustrating a Cole-Cole plot obtained from Sample 2.
Figure 8:
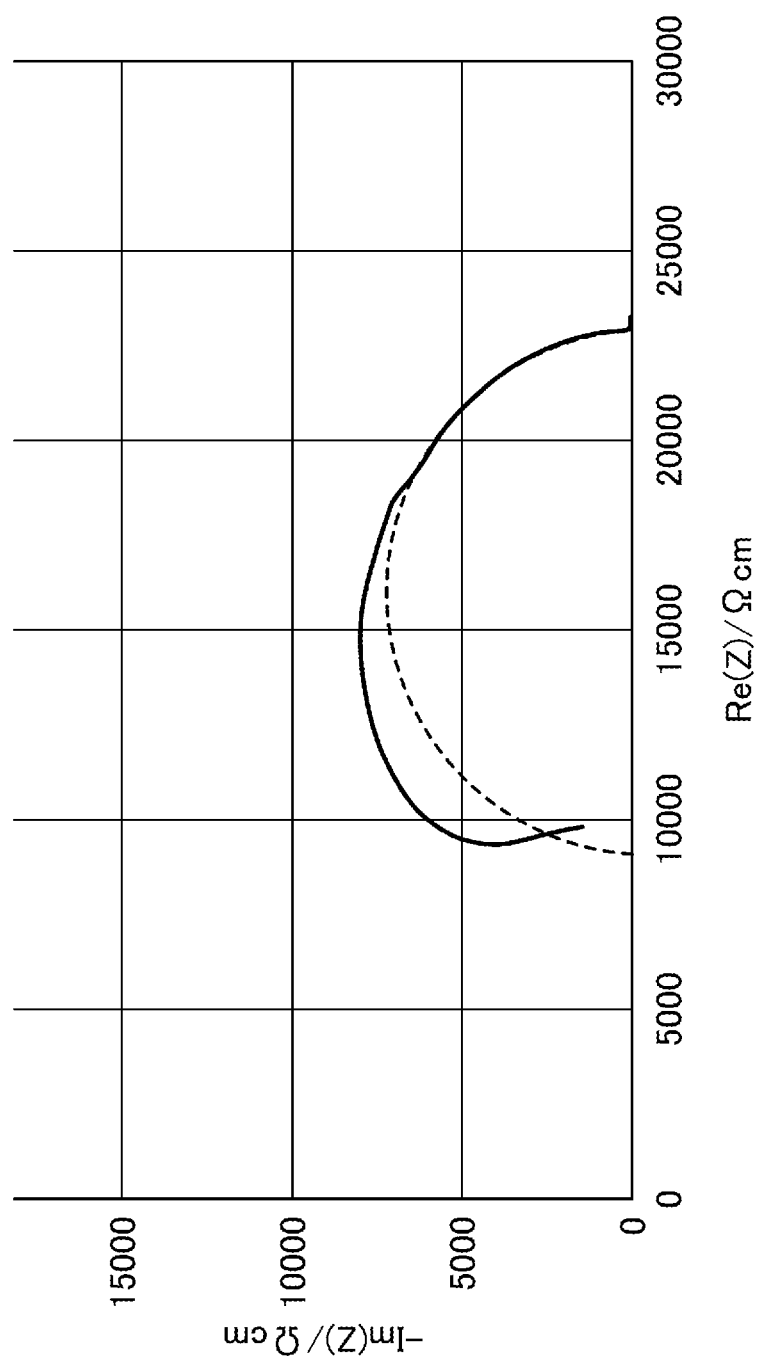
FIG. 8 is a drawing illustrating a Cole-Cole plot obtained from Sample 11.
Figure 9:
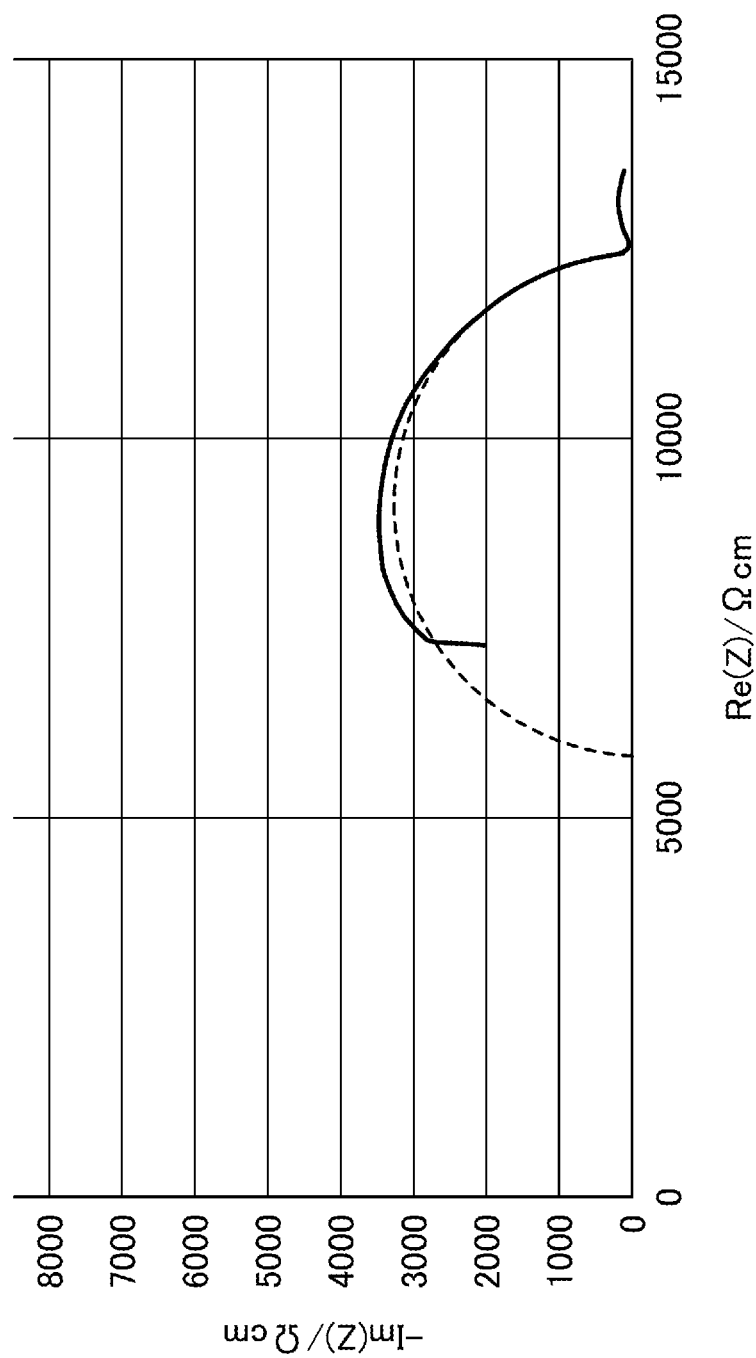
FIG. 9 is a drawing illustrating a Cole-Cole plot obtained from Sample 12.

FIG. 5 illustrates the X-ray diffraction pattern obtained from Sample 1. In FIG. 5, the peaks denoted by wedge symbols correspond to the crystal phases of the mayenite-type compound.

Hence, it was confirmed that the sintered body of Sample 1 was a mayenite-type compound.

A similar result was obtained from Sample 2.
(Resistivity Measurement)
Resistivity measurement was performed using each sample. For resistivity measurement, an impedance method was used.

First, the surface of each sample was polished with sandpaper of from #80 through #1000 to remove and smooth the surface layer.

Next, a platinum electrode having a diameter φ of 6 mm and a thickness of 10 μm was set on the polished surface via a platinum paste. This sample was thermally treated in an open air atmosphere at 1,000° C. for 15 minutes, to solidify the platinum paste.

Next, the sample was set in an electric furnace having an open air atmosphere. The sample was connected to a potentio-galvanostat (SP-150 obtained from Biologic, Inc.) through a platinum wire coupled to the platinum electrode.

Next, the sample was heated to 850° C., and retained at the state for 120 minutes, to stabilize the temperature of the sample.

After the temperature of the sample stabilized, impedance measurement was performed, to generate a Cole-Cole plot. The measurement frequency was from 1 MHz through 100 mHz.

The obtained Cole-Cole plot was fitted by a semicircle, to obtain where the arc of the fitting curve would intersect with the real axis (at two points). In this way, the resistance at the high frequency side (Resistivity 1) and the resistance at the low frequency side (Resistivity 2) were obtained.

FIG. 6 to FIG. 9 illustrate the Cole-Cole plots obtained from Sample 1 to Sample 2, and Sample 11 to Sample 12, respectively.

These drawings also illustrate the arcs obtained by curve-fitting of the measurement results.

Table 3 below collectively presents the results obtained from the samples.

TABLE 3

| Sample | Resistivity 1 ($\Omega$cm) | Resistivity 2 ($\Omega$cm) |
|---|---|---|
| 1 | 1,200 | 2,300 |
| 2 | 950 | 1,450 |
| 11 | 9,000 | 23,000 |
| 12 | 5,800 | 12,500 |

From the obtained results, it can be seen that Sample 1 and Sample 2 had Resistivity 1 and Resistivity 2 that were both considerably lower than those of Sample 11, which was an unsubstituted mayenite-type compound.

Particularly, Sample 2 had Resistivity 1 that decreased to approximately 1/9 of that of Sample 11, and had Resistivity 2 that decreased to approximately 1/15 of that of Sample 11.

On the other hand, Sample 12 had Resistivity 1 and Resistivity 2 that decreased from those of Sample 11, but the decreasing degrees were not so remarkable.

Hence, it was revealed that the resistivity significantly decreased in the mayenite-type compound samples to which Ti was added by 10 mol % and 15 mol % in terms of $TiO_2$.

From these results, it could be inferred that a solid electrolyte obtained by adding more than 8 mol % of Ti to a mayenite-type compound could exhibit a good ion-conducting property.

What is claimed is:

1. An oxide ion-conducting solid electrolyte, comprising:
a mayenite-type compound having a representative composition of $Ca_{12}Al_{14}O_{33}$,
wherein the mayenite-type compound comprises 9 mol % to 30 mol % of Ti in terms of $TiO_2$, the Ti is positioned at an Al atom site, and a Ti/Al ratio of Ti atom to Al atom satisfies $0.15 \leq Ti/Al \leq 0.50$.

2. The oxide ion-conducting solid electrolyte of claim 1, wherein the mayenite-type compound has a C12A7 crystal structure and further comprises at least one atom selected from the group consisting of Mg, Sr, Mn, Co, Ni, Cu, Zn, Ce, Pr, Nd, Sm, Eu, Gd, Dy, Ho, Yb, and Ta such that the at least one atom is replacing a part of Ca.

3. The oxide ion-conducting solid electrolyte of claim 1, wherein the mayenite-type compound has a C12A7 crystal structure and further comprises at least one atom selected from the group consisting of P, Si, Ga, V, Mn, Fe, Co, and Nb such that the at least one atom is replacing a part of Al.

4. An electrochemical cell, comprising:
the oxide ion-conducting solid electrolyte of claim 1.

5. A fuel battery cell, comprising:
the oxide ion-conducting solid electrolyte of claim 1.

6. An electrolysis cell, comprising:
the oxide ion-conducting solid electrolyte of claim 1.

7. An oxygen sensor, comprising:
the oxide ion-conducting solid electrolyte of claim 1.

8. An oxygen pump, comprising:
the oxide ion-conducting solid electrolyte of claim 1.

* * * * *